(12) United States Patent
Plummer et al.

(10) Patent No.: US 7,055,133 B2
(45) Date of Patent: *May 30, 2006

(54) METHOD AND APPARATUS FOR ELIMINATING C RECURSION FROM A JAVA PROGRAMMING LANGUAGE BYTECODE INTERPRETER

(75) Inventors: Christopher J. Plummer, San Martin, CA (US); Dean R. E. Long, Boulder Creek, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/907,698

(22) Filed: Apr. 12, 2005

(65) Prior Publication Data

US 2005/0166185 A1 Jul. 28, 2005

Related U.S. Application Data

(63) Continuation of application No. 09/841,757, filed on Apr. 24, 2001, now Pat. No. 6,915,508.

(60) Provisional application No. 60/210,920, filed on Jun. 12, 2000.

(51) Int. Cl.
*G06F 9/44* (2006.01)

(52) U.S. Cl. ................. 717/118; 717/137; 712/202; 712/208

(58) Field of Classification Search ............. 717/118, 717/137; 712/202, 208
See application file for complete search history.

(56) References Cited

U.S. PATENT DOCUMENTS 4,974,157 A * 11/1990 Winfield et al. ............ 712/202
5,600,844 A 2/1997 Shaw et al. ................. 715/500
5,768,564 A 6/1998 Andrews et al. ............ 717/137
5,884,083 A 3/1999 Royce et al. ................ 717/143
6,061,520 A 5/2000 Yellin et al. ................ 717/148
6,108,767 A * 8/2000 Damron ...................... 712/202
6,205,578 B1 3/2001 Grove ......................... 717/118
6,249,793 B1 6/2001 Printezis et al. ............ 707/206

(Continued)

OTHER PUBLICATIONS

Sullivan et al., "Dynamic native optimization of interpreters", Jun. 2003, Proceedings of the 2003 workshop on Interpreters, virtual machines and emulators, pp.: 50-57, ISBN:1-58113-655-2.*

(Continued)

*Primary Examiner*—Tuan Dam
*Assistant Examiner*—J. Derek Rutten
(74) *Attorney, Agent, or Firm*—Beyer Weaver & Thomas LLP

(57) ABSTRACT

Methods and apparatus for eliminating C recursion from interpreter loops are disclosed. According to one aspect of the present invention, a computer-implemented method for substantially eliminating C recursion from the execution of static initializer methods in a virtual machine environment includes rewriting native C code associated with a static initializer as a Java programming language method, and using a transition frame in a Java programming language stack to execute the Java programming language method. The method also includes using a native method to manipulate the Java programming language stack, and using a first opcode in the transition frame. In one embodiment, using the first opcode in the transition frame includes using the first opcode to determine that the transition frame is associated with the static initializer. In another embodiment, the method further includes causing the static initializer to run, wherein the static initializer using a second opcode, and resuming execution at the second opcode after the static initializer has run.

17 Claims, 6 Drawing Sheets

U.S. PATENT DOCUMENTS

| 6,604,167 B1 | 8/2003 | Blandy et al. ............... 711/100 |
| 2002/0066087 A1 | 5/2002 | Long et al. ................. 717/148 |

OTHER PUBLICATIONS

Brian Maso, "Static Initializers and Uninitializers", May 1, 1998, SYS-CON Media, accessed and printed online on Sep. 15, 2005 at <http://jdj.sys-con.com/read/35987.htm>.*

Alpern et al., "Dynamic Linking on a Shared-Memory Multiprocessor," Oct. 1999, Proceedings of Parallel Architectures and Compilation Techniques, pp. 177-182.

Alpern et al., "Implementing Jalapeno in Java," Nov. 1999, OOPSLA '99, pp. 314-324.

Alpern et al., "The Jalapeno Virtual Machine," Feb. 2000, IBM Systems Journal vol. 39, No. 1, pp. 211-238.

Flanagan, David, "Java in a Nutshell," 1997, ISBN 1-56592-262-X, Section 3.4.

International Search Report mailed Apr. 28, 2003, from International Application No. PCT/US01/16412.

Liang, Sheng, "The Java Native Interface: Programmer's Guide and Specification," Jun. 1999, ISBN 0-201-32577-2, chapter 11.

Liang et al., "Dynamic Class Loading in the Java Virtual Machine," 1998, OOPSLA '98, pp. 36-44.

Lindholm et al., "The Java Virtual Machine Specification," 1996, ASIN: 020163452X, chapters 2, 3 and 6.

Vanderburg, Glenn, "Tricks of the Java Programming Gurus, " 1996, ASIN: 1575211025, chapter 28.

Venners, Bill, "Bytecode Basics," downloaded Jan. 10, 2005, from www.javaworld.com/javaworld/jw-09-1996/jw-09-bytecodes.html.

Venners, Bill, "How the Java Virtual Machine Handles Method Invocation and Return," downloaded Jan. 12, 2005, from www.javaworld.com/javaworld/jw-06-1997/jw-06-hood.html.

Venners, Bill, "The Lean, Mean, Virtual Machine," downloaded Jan. 11, 2005, from www.javaworld.com/javaworld/jw-06-1996/jw-06-vm.html.

* cited by examiner

```
private void runStaticInitializers() throws Throwable {
    CVM.disableRemoteExceptions();
    try {

/* Step 1 - lock the class. */
        synchronized (this) {

/* Step 2 - if someone is currenly initializing this class
             * and it's not our thread, then wait until the class is
             * done initializing. */
            while (checkInitializingFlag(false)) {
                try {
                    wait(0);
                } catch (InterruptedException e) {
                    /* This can't happen since async exceptions are
                     * disabled during static intializers.
                     */
                }
            }

/* Step 3 and 4 - return success if this thread is
             * initializing the class or if the class is already
             * initialized. */
            if (checkInitializingFlag(true) || checkInitializedFlag()) {
                return;
            }

/* Step 5 - fail if class is already in an erroneous state. */
            if (checkErrorFlag()) {
                throw new NoClassDefFoundError(getName());
            }

/* Step 6 - mark the class as "initializing" and unlock it. */
            setInitializingFlag();
        }

/* Step 7 - run the superclass static initialzer. */
        Class superClass = getSuperclass();
        if (superClass != null && !superClass.checkInitializedFlag()) {
            try {
                superClass.runStaticInitializers();
            } catch (Throwable e) {
                synchronized (this) {
                    clearInitializingFlag();
                    setErrorFlag();
                    notifyAll();
                }
                throw e;
            }
        }

/* Step 8 - run the static intializer. */
        Throwable clinitError = null;
        try {
            CVM.executeClinit(this);
        } catch (Throwable e) {
```

Figure 2

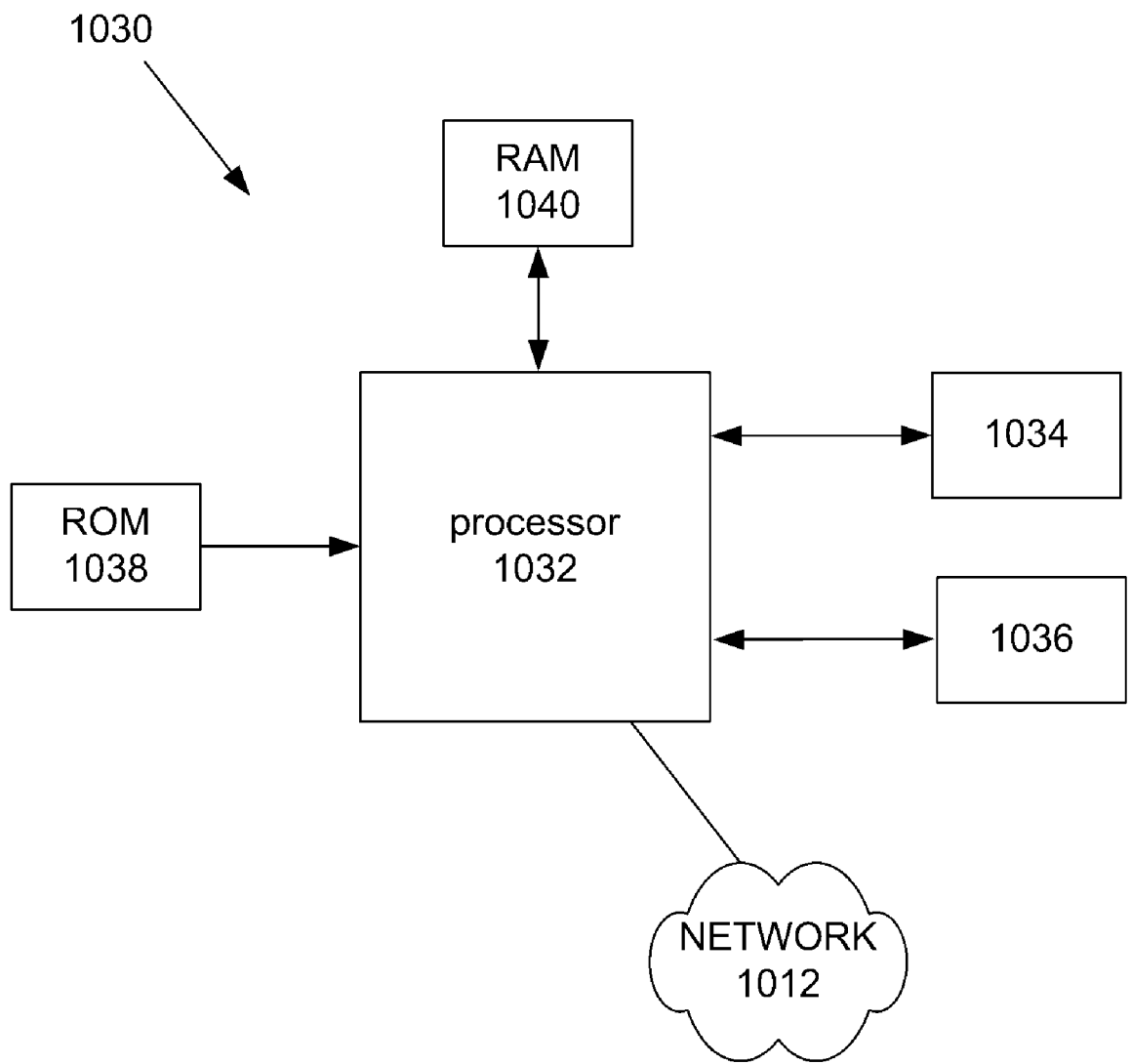
Figure 4
(Conventional)

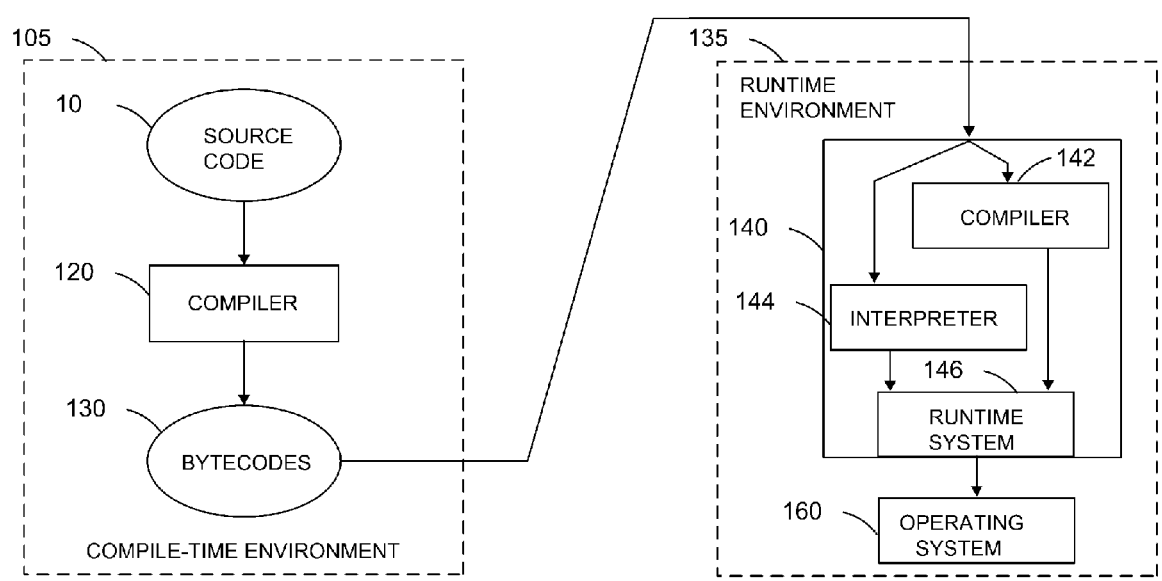
Figure 5
(Conventional)

METHOD AND APPARATUS FOR ELIMINATING C RECURSION FROM A JAVA PROGRAMMING LANGUAGE BYTECODE INTERPRETER

CROSS REFERENCE TO RELATED APPLICATIONS

This application is a continuation of prior application Ser. No. 09/841,757 filed Apr. 24, 2001 now U.S. Pat. No. 6,915,508, from which priority under 35 U.S.C. §120 is claimed and which is incorporated by reference in its entirety. The parent application takes priority under U.S.C. §119(e) of U.S. Provisional Application No. 60/210,920 filed Jun. 12, 2000 entitled, "METHOD AND APPARATUS FOR ELIMINATING C RECURSION FROM A JAVA™ BYTECODE INTERPRETER" by Plummer et. al. which is incorporated by reference in its entirety.

BACKGROUND OF INVENTION

1. Field of Invention

The present invention relates generally to computing systems which include virtual machines. More particularly, the present invention relates to increasing efficiency associated with virtual machines or, more specifically, bytecode interpreters associated with virtual machines.

2. Description of the Related Art

A typical implementation of the JAVA programming language, developed by Sun Microsystems, Inc., of Palo Alto, Calif., is a JAVA programming language virtual machine which contains a bytecode interpreter. A bytecode interpreter, as will be understood by those skilled in the art is typically written in a low-level programming language, e.g., the C programming language, and executes a stack-based intermediate representation of the JAVA programming. The stack-based intermediate representation of the JAVA programming language is called Java bytecodes.

During the course of execution, a virtual machine may use C recursion in a variety of different situations. By way of example, C recursion may occur when a virtual machine re-enters an interpreter loop. A virtual machine may re-enter an interpreter loop such as a JAVA programming language bytecode interpreter loop during the execution of "<clinit>" methods, the execution of method invocation methods, and the execution of constructor methods which initiate new instances of an object. "<clinit>" methods are associated with static initializers used to create memory locations to hold static variables, while method invocation methods, e.g., a Method.invoke( ) method, may invoke methods using reflection, and constructor methods, e.g., a Constructor.newInstance( ) method, may be called the constructor method of a newly instantiated object.

When "<clinit>" methods are executed, an interpreter loop typically calls a native function written in the C programming language, i.e., a native C function, that performs various operations. The operations generally include synchronizing on a class object that represents the class or interface to be initialized using locks, as will be appreciated by those skilled in the art. The operations also generally include waiting on the class object if necessary until it becomes available, and making a recursive request for initialization if needed. In the event that initialization is not possible, the operations include throwing an error. If initialization is possible, the operations may include making a record that indicates that initialization of the class object is in progress. A determination of whether the class object represents a class rather than an interface may also be included in the operation, and if the direct superclass of this class has not yet been initialized, the uninitialized superclass is recursively initialized.

The native C function also performs a lookup for the "<clinit>" method for the class that requires initialization or its static variables, and recursively calls back into the interpreter loop to execute the identified "<clinit>" method. The native C function executes the identified "<clinit>" method of the class, and if the execution of the "<clinit>" method completes normally, then the class object is unlocked. If the execution does not complete as expected, an exception has generally either been created or thrown, and the class object may locked and labeled as erroneous. When the native C function calls back into the interpreter loop to execute a "<clinit>" method, C recursion generally occurs.

C recursion also occurs in an interpreter loop that is associated with calling a Method.invoke( ) method. When a Method.invoke( ) method is called, JAVA programming language frame on a stack may be set up with the arguments for the method that is to be called, and a lookup may be performed to identify the appropriate method to invoke. Then, an interpreter loop may be called to execute the method. In general, when the interpreter loop is called to execute the method, C recursion occurs. After the method is executed, as will be understood by those skilled in the art, cleanup and result handling may be performed.

As mentioned above, calling a Constructor.newInstance( ) method generally requires C recursion in the interpreter loop in order to invoke the constructor method of the object instantiated by the Constructor.newInstance( ) method. When a Constructor.newInstance( ) method is called, a JAVA programming language frame with the arguments for the constructor may be set up, and a lookup may be performed to identify a suitable constructor. An interpreter loop is then typically called to execute the constructor, causing C recursion to occur. After the constructor is executed, cleanup and result handling may be performed.

C recursion is often problematic for a virtual machine, as will be appreciated by those skilled in the art. By way of example, it is generally difficult to efficiently detect C stack overflow. In addition, it may also be difficult to expand an associated C stack. The difficulty associated with expanding a C stack includes the fact that expanding a C stack generally requires machine specific code.

Therefore, it would be desirable to reduce the amount of C recursion which occurs with respect to an interpreter. More particularly, what is needed is a method and an apparatus for replacing C recursion with JAVA programming language recursion in a JAVA programming language bytecode interpreter.

SUMMARY OF INVENTION

The present invention relates to methods and apparatus for eliminating C recursion from interpreter loops. By replacing recursive C loops with, for example, JAVA programming language recursion, stack overflow may be readily identified by a virtual machine, and the overflowed stack may be expanded efficiency. As a result, the overall execution of a virtual machine or, more specifically, an interpreter associated with the virtual machine, may occur more efficiently.

According to one aspect of the present invention, a computer-implemented method for substantially eliminating C recursion from the execution of static initializer methods in a virtual machine environment includes rewriting native C code associated with a static initializer as a JAVA programming language method, and using a transition frame in a JAVA programming language stack to execute the JAVA programming language method. The method also includes using a native method to manipulate the JAVA programming language stack, and using a first opcode in the transition frame. In one embodiment, using the first opcode in the transition frame includes using the first opcode to determine that the transition frame is associated with the static initializer. In another embodiment, the method further includes causing the static initializer to run, wherein the static initializer using a second opcode, and resuming execution at the second opcode after the static initializer has run.

These and other advantages of the present invention will become apparent upon reading the following detailed descriptions and studying the various figures of the drawings.

BRIEF DESCRIPTION OF DRAWINGS

The invention may best be understood by reference to the following description taken in conjunction with the accompanying drawings in which:

FIG. 2 is a diagrammatic representation of the source code associated with Class.runStaticInitializers( ) in accordance with an embodiment of the present invention.

FIG. 4 is a diagrammatic representation of a general-purpose computer system suitable for implementing the present invention.

FIG. 5 is a diagrammatic representation of a virtual machine suitable for implementing the present invention.

DETAILED DESCRIPTION

Figure 1:
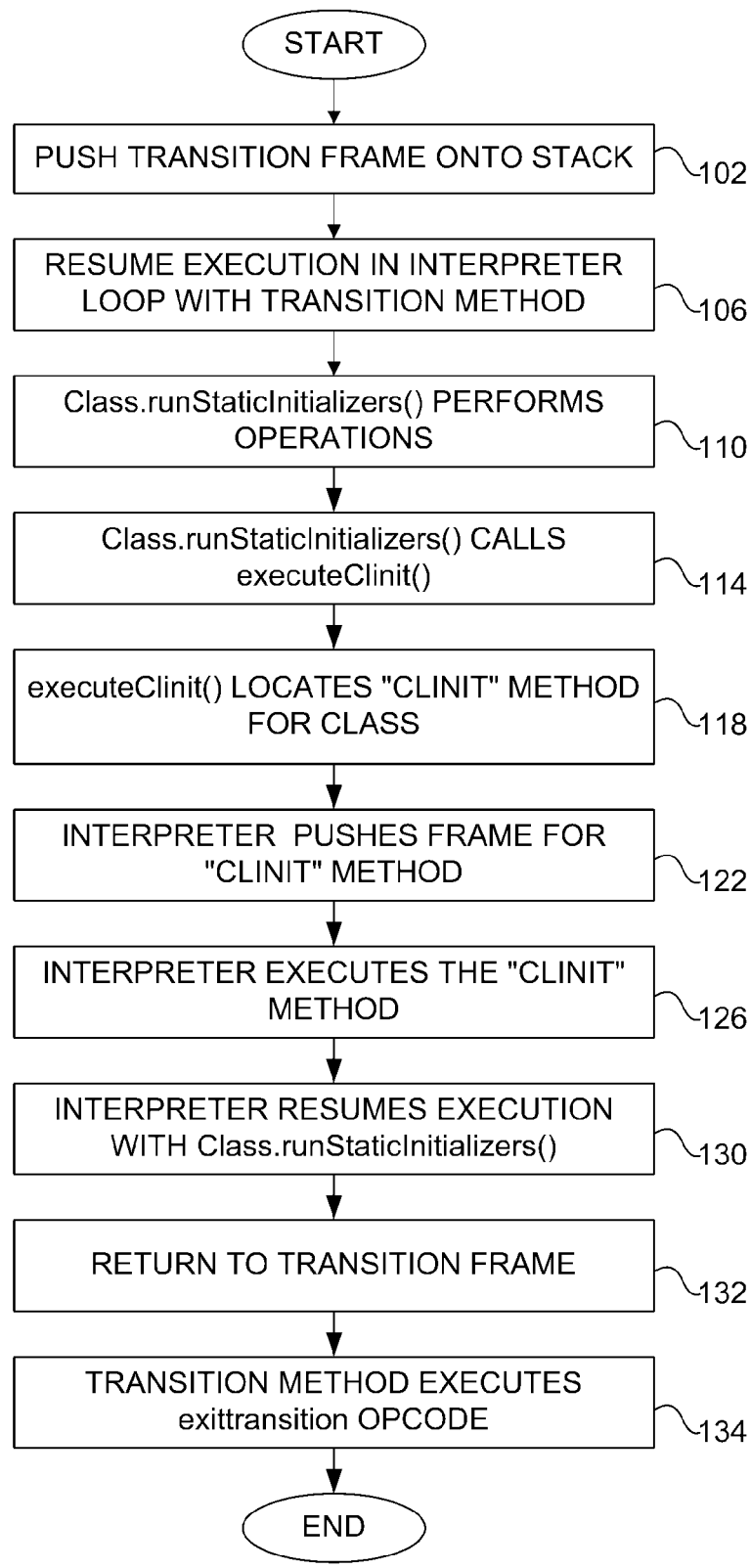
FIG. 1 is a process flow diagram which illustrates the steps associated with the calling of a "<clinit>" method which avoids C recursion in accordance with an embodiment of the present invention.

In the following description, numerous specific details are set forth in order to provide a thorough understanding of the present invention. It will be apparent, however, to one skilled in the art that the present invention may be practiced without some or all of these specific details. In other instances, well known structures or operations have not been described in detail in order to not unnecessarily obscure the invention.

In general, C recursion is undesirable with respect to the execution of a virtual machine. The undesirability includes, for instance, the fact that overflow is difficult to efficiently detect on a C stack, and the fact that it is difficult to expand the size of a C stack. As such, it would be desirable to use JAVA programming language recursion instead of C recursion whenever possible, as a JAVA programming language stack has the advantage of being relatively easy to expand when necessary. It is also relatively easy for a virtual machine to detect stack overflow on a JAVA programming language stack.

C recursion may be associated with the execution of "<clinit>" methods, Method.invoke( ) methods, and Constructor.newInstance( ) methods, as well as class loading. It should be appreciated that substantially any method or area which uses C recursion may be rewritten to utilize JAVA programming language recursion in lieu of C recursion.

In one embodiment, C recursion may be eliminated for the execution of "<clinit>" methods by using, for example, a few different mechanisms. The mechanisms include, but are not limited to, rewriting sections of native C code as a JAVA programming language method called Class.runStaticInitializers( ), using a transition frame to execute Class.runStaticInitializers( ), using an SNI method to manipulate a corresponding JAVA programming language stack so that the "<clinit>" method may be executed without the need to re-enter and interpreter, and using a new opcode, e.g., an opcode called exittransition, in the transition frame method to substantially avoid having to put extra checks in the return opcode. As will be appreciated by those skilled in the art, implementing extra checks in return opcode often results in the slowdown of an overall virtual machine.

Transition frames may be used to simplify invoking a method from virtual machine native code, and may be used to remove C recursion. The transition frames may further be used for purposes other than removing C recursion. In general, a transition frame is a small piece of JAVA programming language bytecodes which "know" how to invoke a particular method. When such bytecodes are executed by an interpreter loop, the associated method may be invoked. Typically, a transition frame is pushed when the interpreter is first entered. Pushing the transition frame allows the interpreter to invoke the initial method without requiring relatively extensive setup outside the interpreter beforehand.

SNI methods are native methods that "understand" how a virtual machine works internally, e.g., SNI methods have knowledge regarding the layout of an associated stack. In one embodiment, there is a specific application programming interface (API) that the interpreter uses to call SNI methods. The API may also be arranged to allow an SNI method to return a new method that the interpreter should jump to. As such, the API enables a JAVA programming language native method to determine which method gets executed next, while also allowing the JAVA programming language native method to remove itself from the JAVA programming language calling chain before the next method is invoked. This allows for simpler argument passing and result handling of the JAVA programming language method that is invoked.

Figure 6:
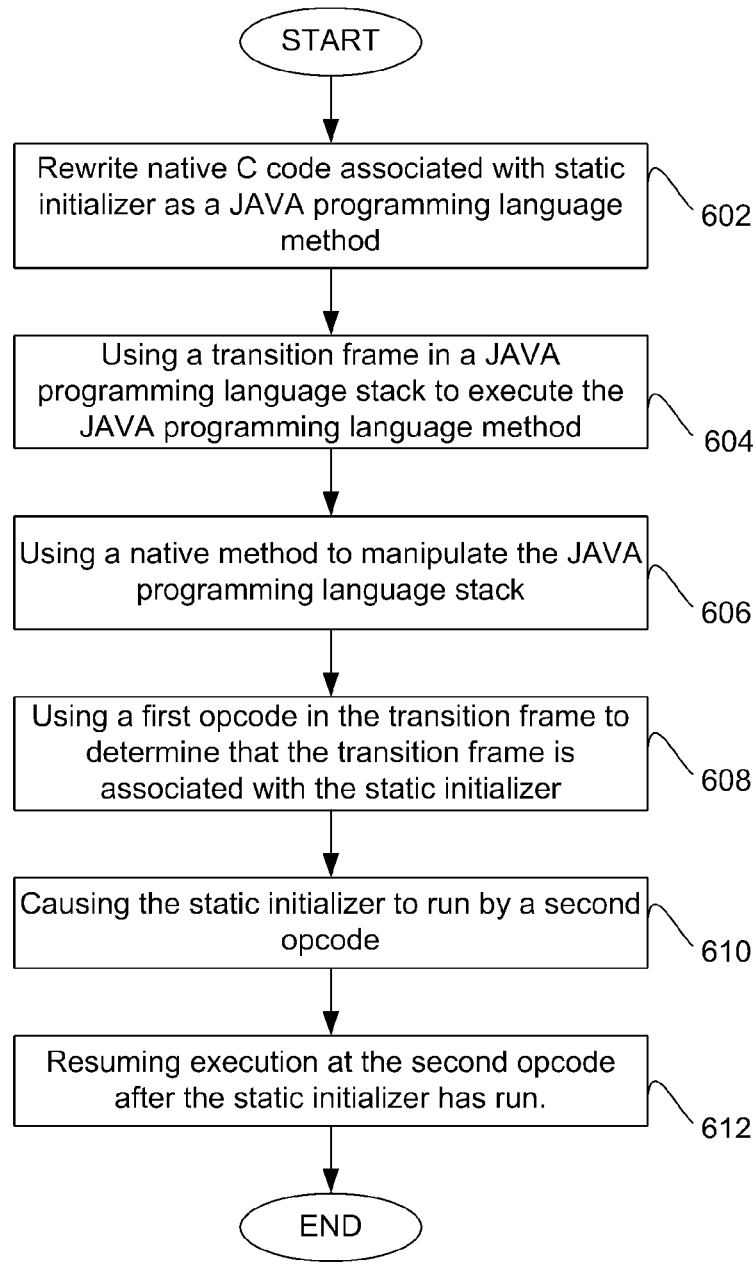
FIG. 6 is a process flow diagram that broadly illustrates a method to reduce recursion from the execution of static initializer methods in a virtual machine environment.

If the virtual machine is executing an opcode that requires that the "<clinit>" method, or static intializer, for a class be called, and detects that the static initializer has been run, then the opcode is executed. Otherwise, if it is detected that the static initializer has not yet been run, then the "<clinit>" method is called. FIG. 6 is a process flow diagram that broadly illustrates a method to reduce recursion from the execution of static initializer methods in a virtual machine environment. Step 602 includes rewriting native C code associated with static initializer as a JAVA programming language method. Step 604 includes using a transition frame in a JAVA programming language stack to execute the JAVA programming language method. Step 606 includes using a native method to manipulate the JAVA programming language stack. Step 608 includes using a first opcode in the transition frame to determine that the transition frame is associated with the static initializer. Step 610 includes causing the static initializer to run by a second opcode. At step 612, execution is resumed at the second opcode after the static initializer has run.

FIG. 1 is a process flow diagram which illustrates the steps associated with the calling of a "<clinit>" method which avoids C recursion in accordance with an embodiment of the present invention. A method of calling a "<clinit>" method begins at step 102 in which a transition frame is pushed onto a JAVA programming language stack. The method referred to in the transition frame, e.g., the transition method, has a few JAVA programming language bytecodes that are aware of how to invoke a JAVA programming language method called Class.runStaticInitializers( ). The source code for Class.runStaticInitializers( ) is shown in FIG. 2, and effectively replaces a large amount of code written in the C programming language that deals with object synchronization, setting flags, checking flags, error handling, and the invocation of an associated "<clinit>" method.

After the transition frame is pushed onto the JAVA programming language stack, the execution in the interpreter loop associated with the opcode resumes with the transition method in step 106. The execution of the transition method, in the described embodiment, causes Class.runStaticInitializers( ) to be invoked. Then, in step 110, Class.runStaticInitializers( ) performs operations performed by the original native C function called by the interpreter loop.

In step 114, Class.runStaticInitializers( ) calls executeClinit( ), an SNI native method. Such an invocation may be performed via the interpreter SNI invocation API. Once called, the executeClinit( ) method locates the appropriate "<clinit>" method for the class in step 118. Since SNI was used to invoke executeClinit( ), SNI may return the "<clinit>" method to the interpreter to execute next.

When the executeClinit( ) method returns to the interpreter, the interpreter pushes the JAVA programming language frame for the "<clinit>" method in step 122. The interpreter then resumes execution at the beginning of the "<clinit>" method. Hence, in step 126, the interpreter executes the "<clinit>" method and pops the associated frame upon completion of the execution.

In general, the next frame on the JAVA programming language stack after the JAVA programming language frame for the "<clinit>" method is for Class.runStaticInitializers( ). Accordingly, in step 130, the interpreter resumes its execution with Class.runStaticInitializers( ), which performs operations such as those shown in FIG. 2. The interpreter then returns in step 132 to the transition frame pushed in step 102.

After the interpreter returns to the transition frame, the transition method executes the exittransition opcode in step 134. The exittransition opcode detects that the transition frame was used to assist in the execution of a "<clinit>" method. Hence, when the transition frame is popped, the program counter for the method that is returned to is not incremented. Instead, execution resumes at the opcode that caused the "<clinit>" method to be run, and the steps associated with calling a "<clinit>" method are completed.

C recursion may be substantially eliminated from the execution of Method.invoke( ) methods by using various mechanisms. In general, to substantially eliminate C recursion, Method.invoke( ) native methods may be rewritten as JAVA programming language methods, and transition frames may also be used to invoke the method passed to Method.invoke( ), thereby enabling Method.invoke( ) to invoke the appropriate method without the need for re-entry into the interpreter. The transition frames may be pushed using an SNI method, and a new opcode, e.g.

Figure 3:
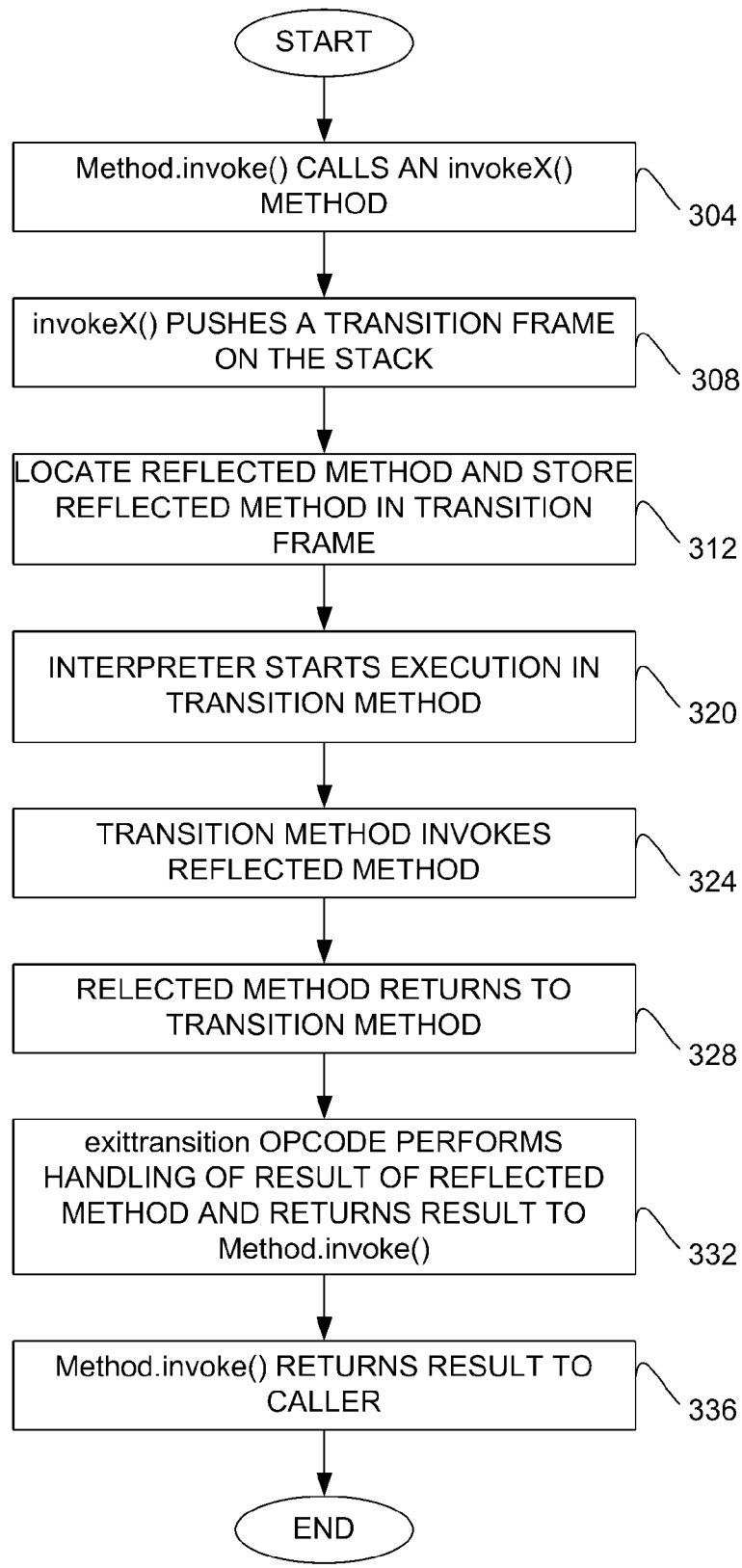
FIG. 3 is a process flow diagram which illustrates the steps associated with the execution of a Method.invoke( ) method which avoids C recursion in accordance with an embodiment of the present invention.

FIG. 3 is a process flow diagram which illustrates the steps associated with the execution of a Method.invoke( ) method in accordance with an embodiment of the present invention. A Method.invoke( ) method may be called during execution of a JAVA programming language method to invoke another JAVA programming language method using reflection. Herein, the method invoked using reflection method will be referred to as the "reflected method."

In step 304, Method.invoke( ) calls an SNI method, or an invokeX( ) SNI method. In one embodiment, a system may include up to approximately ten different SNI methods. The actual SNI method that is called is dependent upon the return type of the reflected method. Once the invokeX( ) method is called, the invokeX( ) method pushes a transition frame onto the JAVA programming language stack in step 308, and stores the arguments for the reflected method on the JAVA programming language stack.

The reflected method is located in step 312, and is stored in the transition frame as the method to be invoked by the transition method. Once the reflected method is located and stored, the interpreter starts execution in the transition method in step 320. After the transition method begins to execute, the transition method invokes the reflected method in step 324.

The reflected method returns to the transition method in step 328, which executes the exittransition opcode before returning. The exittransition opcode detects that it is being used to assist in the invocation of a reflected method and, as a result, performs special handling of the result of the reflected method in step 332 and returns the result to the Method.invoke( ) method. The Method.invoke( ) method, in step 336, returns the result to its caller, and the execution of a Method.invoke( ) method is competed.

In one embodiment, recursion may be eliminated from the execution of Constructor.newInstance( ) in substantially the same way as for Method.invoke( ). Essentially, Constructor.newInstance( ) may be rewritten in the JAVA programming language programming language, and calls an SNI method named Constructor.invokeConstructor( ). The Constructor.invokeConstructor( ) SNI method executes in substantially the same way as the invokeX( ) SNI method in order to invoke the proper method. In the case of Constructor.invokeConstructor( ), the proper method may be the constructor of the object rather than a reflected method.

FIG. 4 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

Computer system 1030 or, more specifically, CPUs 1032, may be arranged to support a virtual machine, as will be appreciated by those skilled in the art. One example of a virtual machine that may be supported on computer system 1030 will be described below with reference to FIG. 5. As is well known in the art, ROM acts to transfer data and instructions uni-directionally to the CPUs 1032, while RAM is used typically to transfer data and instructions in a bidirectional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036.

Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

As previously mentioned, a virtual machine may execute on computer system 1030. FIG. 5 is a diagrammatic representation of a virtual machine which is supported by computer system 1030 of FIG. 4, and is suitable for implementing the present invention. When a computer program, e.g., a computer program written in the JAVA programming language programming language, is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 4, or stored on a storage device such as primary storage 1034 of FIG. 4. In the described embodiment, bytecodes 1130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 4. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, JAVA programming language virtual machines, is described in more detail in *The java™ Virtual Machine Specification* by Tim Lindholm and Frank Yellin (ISBN 0-201-63452-X), which is incorporated herein by reference.

Although only a few embodiments of the present invention have been described, it should be understood that the present invention may be embodied in many other specific forms without departing from the spirit or the scope of the present invention. By way of example, although the present invention has generally been described as being suitable for use with respect to a JAVA programming language virtual machine, the present invention may generally be used with respect to substantially any suitable virtual machine. Suitable virtual machines may include, but are not limited to, Smalltalk virtual machines.

In addition to the areas described above, C recursion may also be substantially eliminated from such areas as classloading using, for example, steps similar to those used to remove C recursion associated with "<clinit>" methods and Method.invoke( ). To implement methods to remove C recursion from other areas, a virtual machine may generally include a native method interface for recursion from a JAVA programming language method, for a transition frame, and for re-executing a bytecode upon return for recursion from an interpreter loop. In order to convert C recursion into recursion such as JAVA programming language recursion a C function may become a JAVA programming language method, and any recursive portion of the function may be written as a JAVA programming language method.

In general, the steps associated with the various processes of the present invention may be widely varied. For instance, steps may be modified and reordered. Steps may also be added and removed without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented method for reducing recursion from the execution of a native method in a virtual machine environment, the method comprising:
   rewriting native code associated with the native method as an interpreted object-oriented programming language method;
   using a transition frame in an interpreted object-oriented virtual machine stack to execute the interpreted object-oriented programming language method;

using a second native method to manipulate the interpreted object-oriented virtual machine stack; and using a first opcode in the transition frame.

2. A method as recited in claim 1 wherein using the first opcode in the transition frame includes using the first opcode to determine that the transition frame is associated with a native method.

3. A method as recited in claim 2 further including causing the native method to run, wherein the native method is caused to run by a second opcode.

4. A method as recited in claim 3 further including resuming execution at the second opcode after the native method has run.

5. A method as recited in claim 4 wherein the transition frame includes interpreted object-oriented programming language code that, when executed, causes the interpreted object-oriented programming language method to be executed.

6. A method as in claim 5, wherein the transition frame further includes interpreted object-oriented programming language code to cause the transition frame to be popped from the interpreted object-oriented virtual machine stack before execution is resumed at the second opcode.

7. A method as recited in claim 1 wherein the native code includes code for identifying the native method.

8. An apparatus for reducing recursion from the execution of native code methods in a virtual machine environment, the method comprising:
   a means for rewriting native code associated with a native method as an interpreted object-oriented programming language method;
   a means for using a transition frame in an interpreted object-oriented virtual machine stack to execute the interpreted object-oriented programming language method;
   a means for using a second native method to manipulate the interpreted object-oriented virtual machine stack; and
   a means for using a first opcode in the transition frame.

9. An apparatus as recited in claim 8 further comprising:
   a means for using the first opcode to determine tat the transition frame is associated with the native method.

10. An apparatus as recited in claim 11 further comprising:
   a means for causing the native method to run, wherein the native method is caused to run by a second opcode.

11. An apparatus as recited in claim 10 further comprising:
   a means for resuming execution at the second opcode after the native method has run.

12. An apparatus as recited in claim 8 wherein the native code includes code for identifying the native method.

13. A computer program product for reducing recursion from the execution of native code methods in a virtual machine environment, comprising:
   computer code for rewriting native code associated with a native method as an interpreted object-oriented programming language method;
   computer code for using a transition frame in an interpreted object-oriented virtual machine stack to execute the interpreted object-oriented programming language method;
   computer code for using a second native method to manipulate the interpreted object-oriented virtual machine stack;
   computer code for using a first opcode in the transition frame; and
   a computer readable medium for storing the computer program product.

14. A computer program product as recited in claim 13 wherein using the first opcode in the transition frame includes using the first opcode to determine that the transition frame is associated with the native method.

15. A computer program product as recited in claim 14 further including:
   computer code for causing the native method to run, wherein the native method is caused to run by a second opcode.

16. A computer program product as recited in claim 15 further including:
   computer code for resuming execution at the second opcode after the native method has run.

17. A computer program product as recited in claim 13 wherein the native code includes code for identifying the native method.

* * * * *